(12) United States Patent
Inaguma

(10) Patent No.: US 8,305,424 B2
(45) Date of Patent: Nov. 6, 2012

(54) SYSTEM, APPARATUS AND METHOD FOR PANORAMA IMAGE DISPLAY

(75) Inventor: Ritsuo Inaguma, Kanagawa (JP)

(73) Assignee: Sony Corporation (JP)

( * ) Notice: Subject to any disclaimer, the term of this patent is extended or adjusted under 35 U.S.C. 154(b) by 1088 days.

(21) Appl. No.: 12/074,344

(22) Filed: Mar. 3, 2008

(65) Prior Publication Data

US 2008/0225132 A1    Sep. 18, 2008

(30) Foreign Application Priority Data

Mar. 9, 2007    (JP) ................. P2007-059596

(51) Int. Cl.
*H04N 7/00* (2006.01)
*H04N 5/228* (2006.01)
*H04N 5/222* (2006.01)

(52) U.S. Cl. ............. 348/36; 348/333.05; 348/333.11; 348/222.1

(58) Field of Classification Search .......... 348/36, 348/37, 38, 39, 231.2, 231.3, 239, 333.01, 348/333.02, 333.05, 333.11, 222.1
See application file for complete search history.

(56) References Cited

U.S. PATENT DOCUMENTS

| | | | | |
|---|---|---|---|---|
| 5,710,661 A | * | 1/1998 | Cook | 359/364 |
| 6,137,534 A | * | 10/2000 | Anderson | 348/222.1 |
| 6,738,073 B2 | * | 5/2004 | Park et al. | 345/629 |
| 6,870,680 B2 | | 3/2005 | Yoshikawa et al. | |
| 7,006,123 B2 | | 2/2006 | Yoshikawa et al. | |
| 7,130,490 B2 | * | 10/2006 | Elder et al. | 382/294 |
| 7,428,000 B2 | * | 9/2008 | Cutler et al. | 348/14.11 |
| 2002/0049979 A1 | * | 4/2002 | White et al. | 725/87 |
| 2002/0063711 A1 | * | 5/2002 | Park et al. | 345/428 |
| 2002/0075258 A1 | * | 6/2002 | Park et al. | 345/419 |
| 2002/0180759 A1 | * | 12/2002 | Park et al. | 345/629 |
| 2003/0026588 A1 | * | 2/2003 | Elder et al. | 386/46 |
| 2003/0133019 A1 | * | 7/2003 | Higurashi et al. | 348/218.1 |
| 2003/0197785 A1 | * | 10/2003 | White et al. | 348/207.99 |
| 2004/0263636 A1 | * | 12/2004 | Cutler et al. | 348/211.12 |
| 2005/0099494 A1 | * | 5/2005 | Deng et al. | 348/36 |
| 2005/0099500 A1 | | 5/2005 | Fujita | |
| 2006/0165309 A1 | | 7/2006 | Yachi et al. | |
| 2006/0268130 A1 | * | 11/2006 | Williams et al. | 348/239 |
| 2006/0268360 A1 | | 11/2006 | Jones | |
| 2008/0180520 A1 | * | 7/2008 | Chang et al. | 348/36 |

FOREIGN PATENT DOCUMENTS

| | | | |
|---|---|---|---|
| JP | 07-143439 | A | 6/1995 |
| JP | 11-234644 | A | 8/1999 |
| JP | 2001-094857 | A | 4/2001 |
| JP | 2002-314867 | A | 10/2002 |
| JP | 2003-018583 | A | 1/2003 |
| JP | 2003-087772 | A | 3/2003 |
| JP | 2003-162018 | A | 6/2003 |

(Continued)

*Primary Examiner* — Nicholas Giles
(74) *Attorney, Agent, or Firm* — Lerner, David, Littenberg, Krumholz & Mentlik, LLP

(57) ABSTRACT

Camera sections pick up divided images obtained by dividing a panorama image to generate image data at a high resolution. Image data processing sections perform compression encoding on the image data at the high resolution through encoder to obtain first compressed image data. The image data processing sections perform size change to obtain image data at a low resolution and perform compression encoding on the image data through another encoder to obtain second compressed image data. A data transfer section transmits the first and second compressed image data through a network to an image display apparatus.

26 Claims, 12 Drawing Sheets

FOREIGN PATENT DOCUMENTS

| | | |
|---|---|---|
| JP | 2004-062103 A | 2/2004 |
| JP | 2004-187068 A | 7/2004 |
| JP | 2005-142654 A | 6/2005 |
| JP | 2005-176301 A | 6/2005 |
| JP | 2005-197948 A | 7/2005 |
| JP | 2005-333552 A | 12/2005 |
| JP | 2008-545300 A | 12/2008 |

* cited by examiner

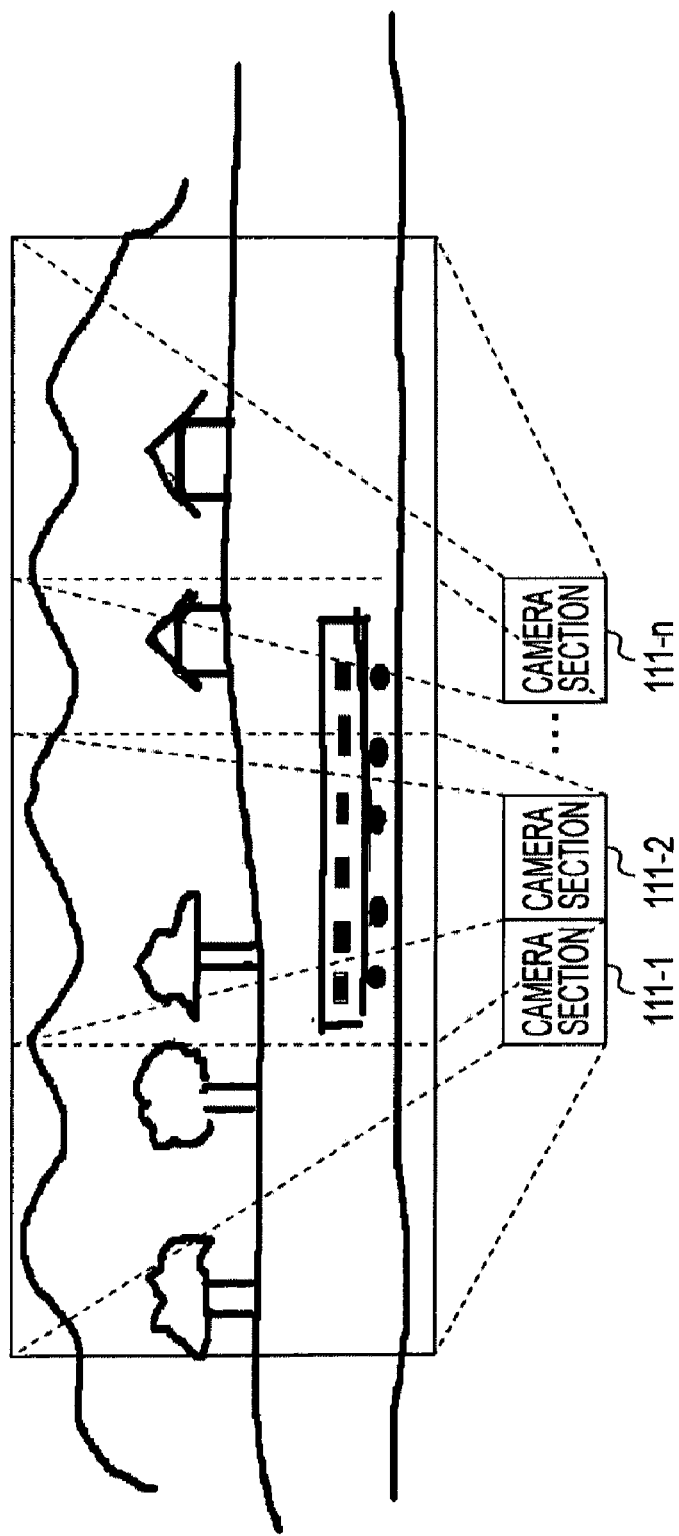

DELIVER RGB VALUES, FOR EXAMPLE,
AS GRADATION INFORMATION WITH RESPECT
TO WHITE BACKGROUND

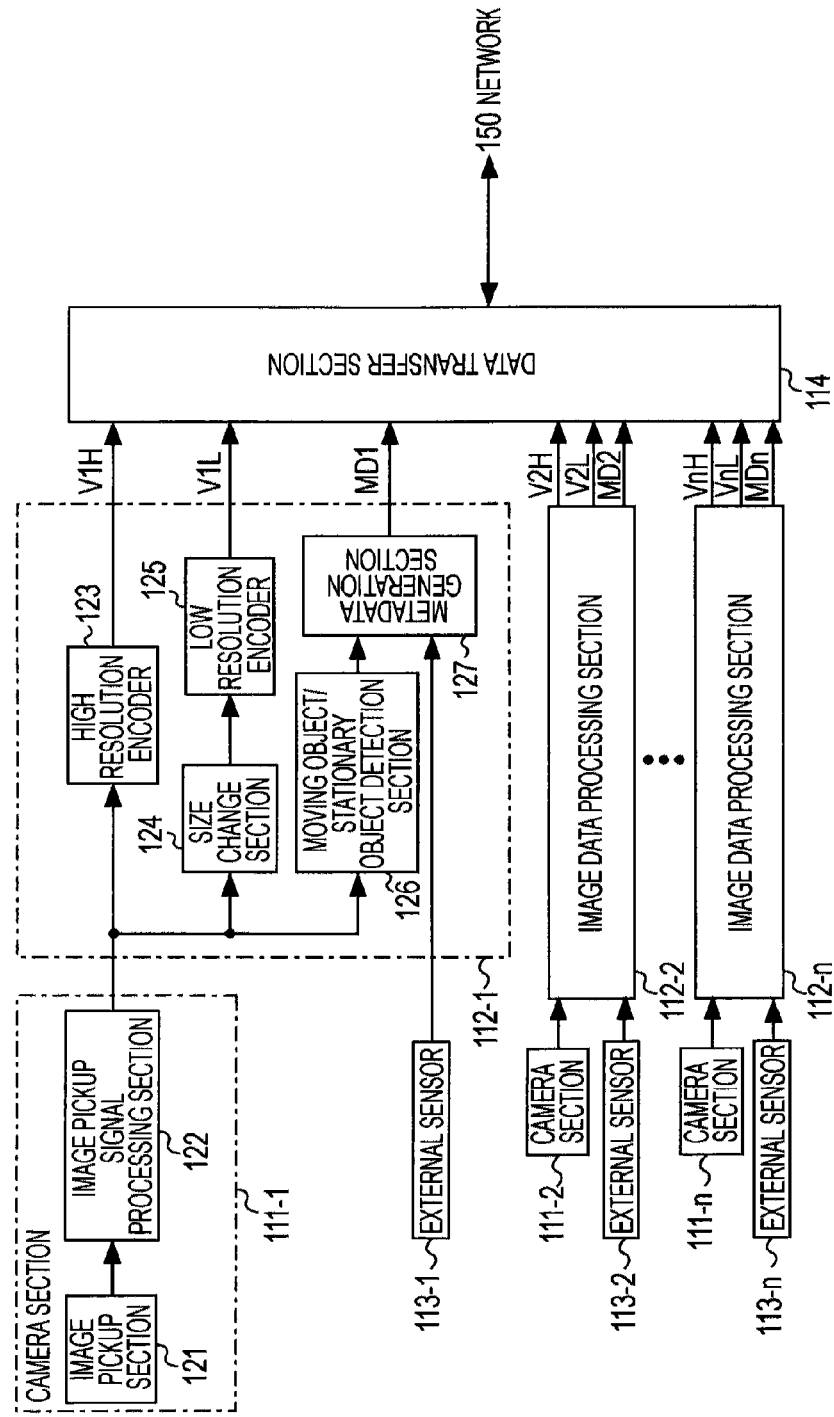

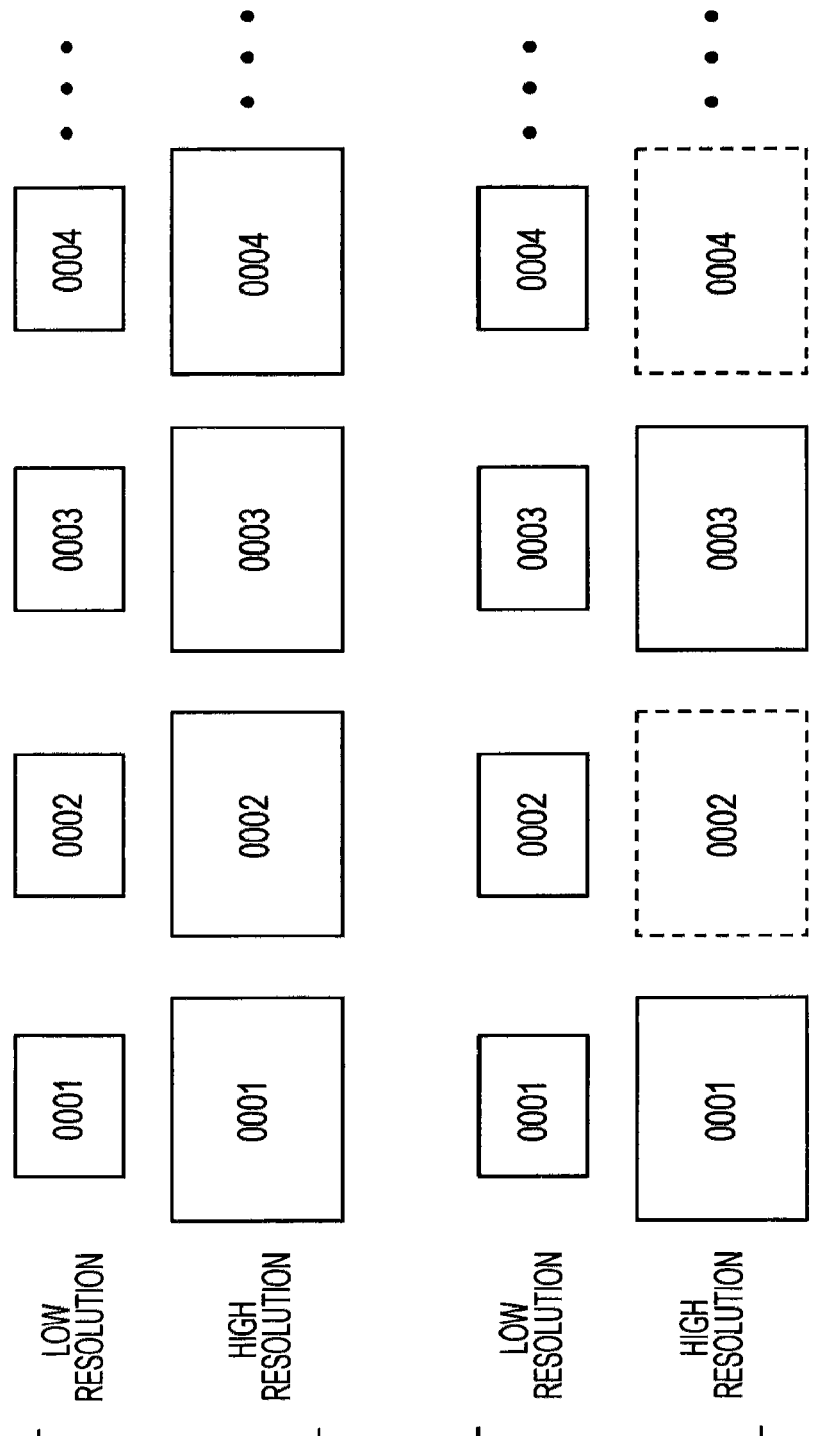

SYSTEM, APPARATUS AND METHOD FOR PANORAMA IMAGE DISPLAY

CROSS-REFERENCE TO RELATED APPLICATIONS

The present application claims priority from Japanese Patent Application No. JP 2007-059596 filed in the Japanese Patent Office on Mar. 9, 2007, the entire content of which is incorporated herein by reference.

BACKGROUND OF THE INVENTION

1. Field of the Invention

The present invention relates to an image display system, an image transmission apparatus, an image transmission method, an image display apparatus, an image display method, and a program which are suitable to be applied to, for example, a monitoring system. In particular, this invention relates to an image display system and the like in which on an image transmission apparatus side, through carrying out a processing on respective image data from a plurality of camera sections generated adapted to pick up a panorama image, first compressed image data obtained by compression-encoding image data at a high resolution and second compressed image data obtained by compression-encoding image data at a low resolution are generated and transmitted, and on an image display apparatus side, the panorama image is displayed by using decoded data of plural pieces of the received second compressed image data, and the high resolution image is displayed by using, among the plural pieces of the received first compressed image data, decoded data of the first compressed image data of the divided images corresponding to the predetermined position determined on the panorama image, so that the data processing amount during the data transmission and image display is reduced and a processing load is alleviated.

2. Description of the Related Art

In recent years, the number of pixels provided in a digital camera and a video camera has been increased. A digital camera having more than 10 million pixels is commonly available, and a consumer-use HD (High Definition) video camera is also on the market. When image data obtained by capturing images with these cameras is transferred, an encoding processing is carried out in order to reduce a transfer band. Examples of the encoding processing mainly include JPEG, MPEG-2, and MPEG-4.

Attempts by using these encoding technologies for distributing high pixel images to a network such as the Internet are often practiced. For example, Japanese Unexamined Patent Application Publication Nos. 2003-18583 and 2005-333552 describe recording and distribution of a wide angle image (wide area image) by using a plurality of cameras. However, the distribution described in Japanese Unexamined Patent Application Publication No. 2003-18583 or 2005-333552 is of a type in which the image data is accumulated in a video server. As it is expected that the number of the pixels will be further increased in future, this type has a limitation in terms of scalability.

In a trend towards the higher number of pixels, for example, as described in Japanese unexamined Patent Application Publication Nos. 2003-162018 and 2002-314867, there is proposed an apparatus using a plurality of cameras in a viewpoint coincident optical system, and therefore the importance of the encoding processing in the image transfer is increased. As countermeasures for limiting the transfer band, a multi-resolution encoding or a rate control method in accordance with the band of a transfer path or on a reception side are conceivable. These methods are embodied with a technology of JPEG 2000 which is based on wavelet transformation.

Also, such a method is conceived that the data transfer among is reduce while in accordance with a change in situation, only a part determined to be necessary is transferred, and the data resolution is changed (for example, refer to Japanese Unexamined Patent Application Publication No. 2005-176301). However, according to the method disclosed in Japanese Unexamined Patent Application Publication No. 2005-176301, as an area determined to be unnecessary is previously sent out and the image of the necessary area is overlapped afterwards, a time difference between the peripheral area and the attention area may be generated. The method is effective in a situation where a change around the peripheral area is considered to be not large, but the method is not suitable in a case of sport broadcasting or concert broadcasting where images including peripheral areas need to be displayed in real time.

In addition, an embodiment using a wide angle image pickup system such as a fish-eye lens is also proposed. However, in many cases, a subject at far becomes smaller, and a distance at which monitoring can be performed on entering people is a disadvantage compared with a normal zoom type monitoring camera.

Furthermore, as a camera for capturing images at a plurality of resolutions in real time, for example, there is conceived, as disclosed in Japanese Unexamined Patent Application Publication No. 7-143439, a camera in which a low resolution motion picture is associated with a high resolution motion picture, or as disclosed in Japanese Unexamined Patent Application Publication No. 2005-197948, a camera in which a low resolution image is generated based on a high resolution image and the images are formed into a motion picture. However, both of the apparatuses are not an apparatus for displaying a high resolution motion picture.

Moreover, Japanese Unexamined Patent Application Publication No. 2004-62103 discloses a method of dividing and displaying images on a single HD (High Definition) image based on a coordinate conversion table in which signals from a plurality of cameras are previously obtained. An advantage of this method resides in that a target image can be obtained in real time when a panorama image is generated from the plurality of divided images by using the coordinate conversion table.

SUMMARY OF THE INVENTION

As described above, the technologies described in Japanese Unexamined Patent Application Publication Nos. 7-143439 and 2005-197948 do not represent an apparatus for displaying the high resolution motion picture. Also, for example, according to the method disclosed in Japanese Unexamined Patent Application Publication No. 2004-62103, the plurality of camera signals are collected into one to obtain the final output. However, the method is difficult to cope with the increase in the number of pixels and the higher frame rate when the panorama image is displayed.

It is desirable to decrease the processing data amount during the data transmission and the image display and to the processing load when the high resolution motion picture is displayed.

According to an embodiment of the present invention, there is provided an image display system including:
an image transmission apparatus; and
an image display apparatus, the image transmission apparatus being connected to the
image display apparatus via a network,
the image transmission apparatus including
a plurality of camera sections adapted to output image data
corresponding to respective divided images obtained by
dividing a panorama image into plural pieces,
a plurality of image data processing sections adapted to
carry out a processing on the image data output from the
respective camera sections to generate first compressed
image data by compression-encoding image data at a
first resolution and generate second compressed image
data by compression-encoding image data at a second
resolution which is lower than the first resolution, and
a data transmission section adapted to transmit the first
compressed image data and the second compressed
image data generated in the respective image data processing sections to the image display apparatus,
the image display apparatus including
a data reception section adapted to receive the first compressed image data and the second compressed image
data transmitted from the image transmission apparatus,
a first image data generation section adapted to generate
panorama image data for displaying the panorama
image by using decoded data of plural pieces of the
second compressed image data received in the data
reception section,
a view angle determination section adapted to determine a
high resolution view angle on the panorama image,
a second image data generation section adapted to generate
high resolution image data for displaying a high resolution image by using, among the plural pieces of the first
compressed image data received in the data reception
section, decoded data of the first compressed image data
of the divided images corresponding to the high resolution view angle determined in the view angle determination section, and
a display section adapted to display the panorama image
based on the panorama image data generated in the first
image data generation section and the high resolution
image based on the high resolution image data generated
in the second image data generation section on a display.

According to an embodiment of the present invention, the image display system has such a configuration that the image transmission apparatus is connected to the image display apparatus via a network. The image transmission apparatus includes a plurality of camera sections. With the plurality of camera sections, respective divided images obtained by dividing a panorama image (a wide angle image, or a wide area image) are picked up, and image data corresponding to the respective divided images can be obtained.

The respective image data processing sections of the image transmission apparatus carry out a processing on the image data output from the respective camera sections to generate first compressed image data by compression-encoding image data at a first resolution and generate second compressed image data by compression-encoding image data at a second resolution which is lower than the first resolution. For example, the first resolution is UXGA (Ultra extended Graphics Array) and the second resolution is QVGA (Quarter Video Graphics Array).

The first compressed image data and the second compressed image data generated in the respective image data processing sections are transmitted to the image display apparatus by the data transmission section via the network. In this manner, according to an embodiment of the present invention, unlike a case where the image data output from the respective camera sections is used to render the panorama image and transmit it from the image transmission apparatus to the image display apparatus, the processing data amount on the image transmission apparatus side is reduced and the processing load is alleviated.

It should be noted that according to an embodiment of the present invention, for example, the respective image data processing sections may generate metadata including one of detection information on a moving object or a stationary object detected by processing the image data output from the camera sections and detection information from an external sensor, and this metadata may be transmitted to the image display apparatus by the data transmission section via the network. In this manner, as the detection information including the metadata is transmitted to the image display apparatus, it is possible on the image display apparatus to display the detection information on the panorama image, or furthermore, to display the high resolution image or the like corresponding to the detection position with ease.

Also, according to an embodiment of the present invention, the respective image data processing sections may generate the first compressed image data by using a smaller number of frames than that for generating the second compressed image data. In this case, in the respective image data processing sections, the number of processing frames of the first image data at the high resolution can be decreased, and the processing load is alleviated.

In addition, according to an embodiment of the present invention, the respective image data processing sections may cut out image data at a predetermined image area from the image data output from the camera sections and carry out the compression encoding on the cutout image data to generate the first compressed image data. For example, the predetermined image area is determined based on one of the detection information on the moving object or the stationary object detected by processing the image data output from the camera sections and the detection information from the external sensor. Also, for example, the predetermined image area is determined based on information on the attention area at the predetermined field angle set on the panorama image received in the information reception section. In this case, the respective image data processing sections carry out the processing, for example, while only the image data of the image area necessary on the image display side is cut out from the image data output from the camera sections, and therefore the processing data amount is small and the processing load is alleviated.

The data reception section of the image display apparatus receives the first compressed image data and the second compressed image data generated in the respective image data processing sections of the image transmission apparatus. The first image data generation section carries out the decoding of plural pieces of the second compressed image data and generates the panorama image data for displaying the panorama image by using the decoded data. In this case, the second compressed image data relates to data at the second resolution (low resolution) as described above, and therefore in the first image data generation section, the processing data amount is small and the processing load is alleviated. The display section displays the panorama image based this panorama image data on the display. For example, in this case, such a processing for collecting plural pieces of image data into one is not carried out, but the display is performed while the respective image data pieces are arranged and held at an address corresponding to a video RAM. In this case, the countermeasure becomes facilitated to cope with the increase in the number of pixels and the higher frame rate when the panorama image is displayed.

It should be noted that according to an embodiment of the present invention, the data reception section further receives the metadata including one of the detection information on the moving object or the stationary object detected by processing the image data output from the respective camera sections and the detection information from the external sensors provided to the corresponding camera sections. A third image data generation section may generate detection position image data for displaying a detection position image by using, among the plural pieces of second compressed image data received in the data reception section, decoded data of the second compressed image data of the divided images corresponding to the detection position indicated by the detection information, and the display section may further display the detection position image based on the detection position image data. In this case, the detection position images corresponding to the respective detection positions on the display in an index display style. Then, in this case, the decoded data of the second compressed image data which has been already obtained for displaying the panorama image is used, which does not lead to the substantial increase in processing load.

Also, according to an embodiment of the present invention, for example, an attention area setting section sets an attention area on the panorama image displayed on the display. A fourth image data setting section may generate attention area image data for displaying an attention area image by using, among the plural pieces of second compressed image data received in the data reception section, decoded data of the second compressed image data of the divided images corresponding to the attention area, the display section may further display the attention area image based on the attention area image data on the display. In this case, it is possible to display the attention area images corresponding to the respective attention areas in an index style. Then, in this case, the decoded data of the second compressed image data which has been already obtained for displaying the panorama image is used, which does not lead to the substantial increase in processing load.

A view angle determination section determines a high resolution view angle on the panorama image. For example, the high resolution view angle is determined based on a position selection operation executed by a user. Also, for example, the high resolution view angle may be determined based on the detection position image selection operation executed by the user when the detection position image is displayed on the display as described above. Also, for example, the high resolution view angle may be determined based on the attention area image selection operation executed by the user when the attention area image is displayed on the display as described above.

In addition, according to an embodiment of the present invention, for example, the second image data generation section may generate the high resolution image data for displaying the high resolution image by using the first compressed image data of the divided images corresponding to the high resolution view angle determined in the view angle determination section and the second compressed image data at a predetermined combination ratio. In this case, in the second image data generation section, the number of frames of the first compressed image data that should be decoded can be decreased and the processing load is alleviated.

According to an embodiment of the present invention, there is provided an image processing apparatus adapted to generate an image displayed on a display, the image processing apparatus including:

a data reception section adapted to receive plural pieces of first compressed image data obtained by compression-encoding image data at a first resolution generated through carrying out a processing on respective pieces of image data corresponding to divided images obtained by dividing the panorama image into plural pieces and plural pieces of second compressed image data obtained by compression-encoding image data at a second resolution which is lower than the first resolution;

a first image data generation section adapted to generate panorama image data for displaying the panorama image by using decoded data of plural pieces of the second compressed image data received in the data reception section;

a view angle determination section adapted to determine a high resolution view angle on the panorama image;

a second image data generation section adapted to generate high resolution image data for displaying a high resolution image by using, among the plural pieces of the first compressed image data received in the data reception section, decoded data of the first compressed image data of the divided images corresponding to the high resolution view angle determined in the view angle determination section; and an output section adapted to output the panorama image data generated in the first image data generation section and the high resolution image data generated in the second image data generation section on the display.

According to an embodiment of the present invention, for example, on the image transmission apparatus side, through carrying out the processing on the respective pieces of image data from the plurality of camera sections generated adapted to pick up the panorama image, the first compressed image data obtained by compression-encoding the image data at the high resolution and the second compressed image data obtained by compression-encoding the image data at the low resolution are generated and transmitted, and on the image display apparatus side or the image processing apparatus side, the panorama image is displayed by using the decoded data of the plural pieces of the received second compressed image data, and the high resolution image is displayed by using, among the plural pieces of the received first compressed image data, the decoded data of the first compressed image data of the divided images corresponding to the predetermined position which is determined on the panorama image, whereby the data processing amount during the image display can be reduced and the processing load can be alleviated.

BRIEF DESCRIPTION OF THE DRAWINGS

FIG. 2 illustrates an arrangement example of a plurality of camera sections;

FIG. 4 is a block diagram of a specific example of an image transmission apparatus;

FIGS. 9A and 9B illustrate a transmission frame example of first compressed image data related to the high resolution (first resolution) and second compressed image data related to the low resolution (second resolution);

DESCRIPTION OF THE PREFERRED EMBODIMENTS

Hereinafter, with reference to drawings, embodiments of this invention will be described.

Figure 1:
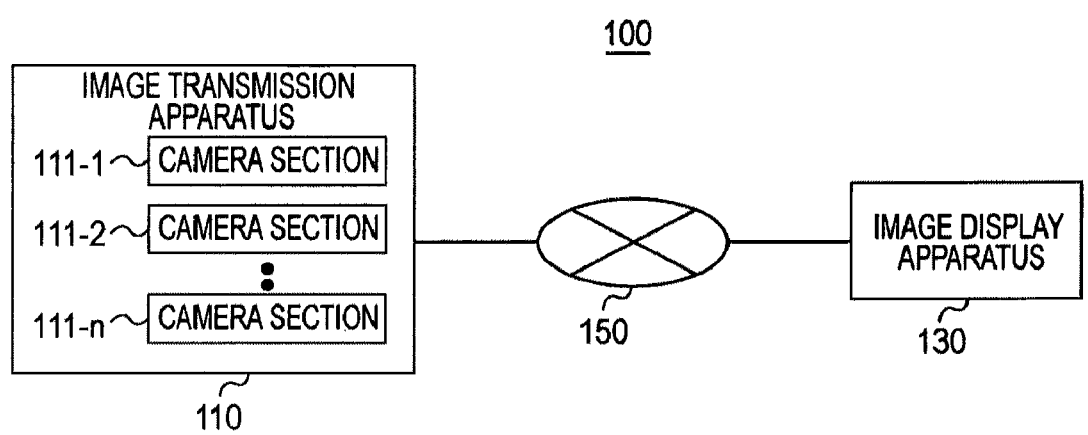
FIG. 1 is a block diagram of a configuration example of an image display system according to an embodiment of the present invention.

FIG. 1 illustrates a configuration example of an image display system 100 according to an embodiment of the present invention. The image display system 100 has such a configuration that an image transmission apparatus 110 is connected to the image display apparatus 130 via a network 150. The network 150 is composed of a LAN (Local Area Network), the Internet, or the like.

The image transmission apparatus 110 has camera sections 111-1 to 111-n by the number of n (n is an integer equal to or larger than 2). These n camera sections 111-1 to 111-n are adapted to output image data by capturing the respective divided images obtained by dividing a panorama image that is a wide angle image (wide area image) into n pieces. For example, the panorama image is a wide angle image extending in a horizontal direction, and the panorama image is divided horizontally into n pieces. The respective camera sections 111-1 to 111-n are adapted to output image data at a first resolution, for example, UXGA (Ultra extended Graphics Array). It should be noted that UXGA represents a resolution of 1600×1200 pixels.

Figure 3A:
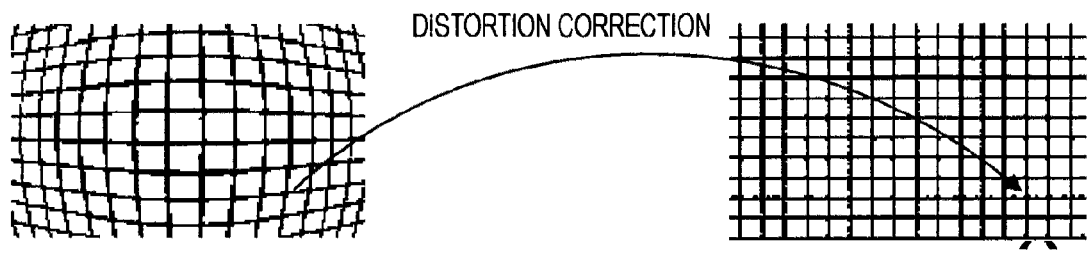
FIG. 3A illustrates lens distortion correction used when panorama image data is generated.
Figure 3B:
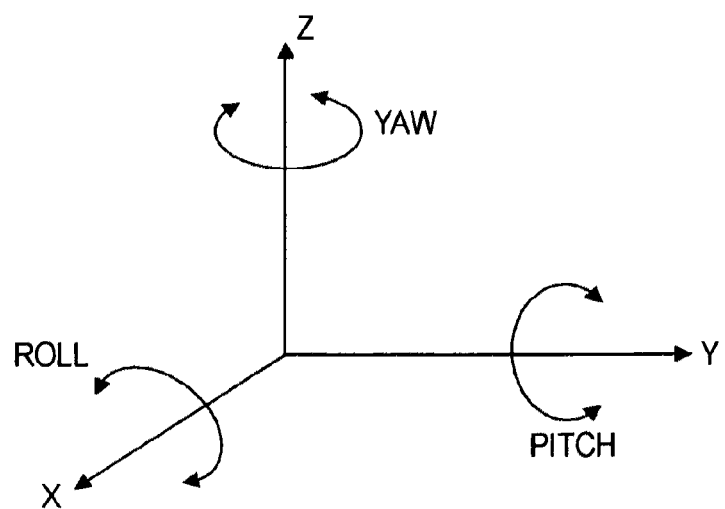
FIG. 3B illustrates camera inclination information which constitutes the image transforming information used when the panorama image data is generated.
Figure 3C:
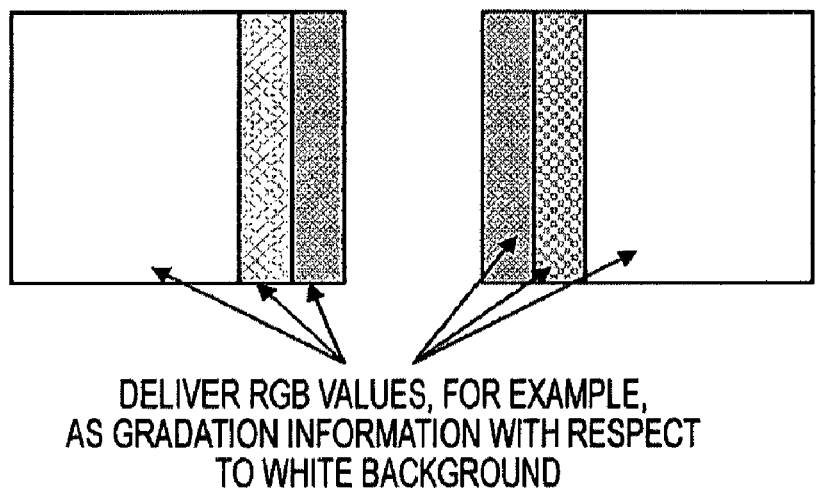
FIG. 3C illustrates blending information regarding adjacent cameras, which constitutes the image transforming information used when the panorama image data is generated.

FIG. 2 illustrates an arrangement example of the n camera sections 111-1 to 111-n. The respective camera sections are arranged so as to generate a panorama image in certain continuous areas intended to be picked up. At this time, although a detail description will be omitted, when the panorama image is generated by using the image data from the respective camera sections, image transforming information is necessary including lens information such as distortion or focal length (refer to FIG. 3A), information on camera inclination (Roll, Pitch, and Yaw) (refer to FIG. 3B), or blending information with adjacent cameras (refer to FIG. 3C). The image transmission apparatus 110 previously obtains this image transforming information. The image transforming information is transmitted from the image transmission apparatus 110 via the network 150 to the image display apparatus 130. In this manner, as the image transforming information is transmitted from the image transmission apparatus 110 to the image display apparatus 130, it is not necessary on the image display apparatus 130 to save image transforming information for each different image transmission apparatus 110.

The image transmission apparatus 110 is adapted to generate first compressed image data by compression-encoding the image data at the first resolution through carrying out a processing on the image data output from the respective camera sections 111-1 to 111-n. Also, the image transmission apparatus 110 is adapted to generate second compressed image data by compression-encoding the image data at a second resolution which is lower than the first resolution through carrying out a processing on the image data output from the respective camera sections 111-1 to 111-n. For example, the image transmission apparatus 110 generates the second compressed image data by compression-encoding the image data at QVGA (Quarter Video Graphics Array). It should be noted that QVGA represents a resolution of 320× 240 pixels. The image transmission apparatus 110 is adapted, as described above, to transmit the n pieces of the first compressed image data generated and the n pieces of the second compressed image data generated via the network 150 to the image display apparatus 130.

The image display apparatus 130 is adapted to receive the n pieces of the first compressed image data and the n pieces of the second compressed image data transmitted from the image transmission apparatus 110. Then, the image display apparatus 130 generates panorama image data for displaying the panorama image by using decoded data of the n pieces of the second compressed image data and displays the panorama image based on the panorama image data on a display. It should be noted that when the image display apparatus 130 generates the panorama image data, as described above, the image transforming information such as the lens information, the information on camera inclination, or the blending information with adjacent cameras transmitted from the image transmission apparatus 110 is used.

In addition, the image display apparatus 130 determines a high resolution view angle on the panorama image. Then, the image display apparatus 130 generates high resolution image data for displaying a high resolution image by using decoded data of the first compressed image data of divided images corresponding to the high resolution view angle among the n pieces of the first compressed image data, and displays the high resolution image based on the high resolution image data on the display.

FIG. 4 illustrates a configuration example of the image transmission apparatus 110. The image transmission apparatus 110 has the n camera sections 111-1 to 111-n, image data processing sections 112-1 to 112-n by the number of n, external sensors 113-1 to 113-n by the number of n, and a data transfer section 114.

The n camera sections 111-1 to 111-n picked up, as described above, the respective images obtained by dividing the panorama image that is the wide angle image (wide area) into n pieces and output the image data at the first resolution (for example, UXGA).

The camera section 111-1 has an image pickup section 121 and an image pickup signal processing section 122. The image pickup section 121 has an image pickup lens and an imager element which are not shown. The image pickup section 121 picks up a divided image to be dealt with by itself among the respective divided images obtained by dividing the panorama image into n pieces and outputs an image pickup signal corresponding to this divided image. The imager element is composed of a CCD (Charged Coupled Device), a CMOS (Complementary Metal-Oxide Semiconductor), or the like.

For the image pickup signal (analog signal) output from the image pickup section 121, the image pickup signal processing section 122 performs sample and hold, gain control conversion, and conversion from the analog signal to a digital signal, as well as white balance adjustment, gamma correction, and the like to generate the image data at the first resolution (for example, UXGA). The image signal processing section 122 performs white balance adjustment, gain control and shading correction, so as to make no difference with next cameras in addition to signal processing performed generic cameras before image data processing section.

The image data processing section 112-1 has a high resolution encoder 123, a size change section 124, a low resolution encoder 125, a moving object/stationary object detection section 126, and a metadata generation section 127.

The high resolution encoder 123 is adapted to carry out a compression encoding processing on the image data at the first resolution output from the camera section 111-1 to generate a first compressed image data V1H. The high resolution encoder 123 carries out, for example, a compression encoding processing based on Motion JPEG (Joint Photographic Experts Group).

The size change section 124 is adapted to carry out a processing such as resizing or resampling on the image data at the first resolution output from the camera section 111-1 to generate image data at a second resolution (for example, QVGA) which is lower than the first resolution. The low resolution encoder 125 is adapted to carry a compression encoding processing on the image data at the second resolution output from the size change section 124 to generate a second compressed image data V1L. The low resolution encoder 125 carries out, similarly to the above-mentioned high resolution encoder 123, for example, a compression encoding processing based on Motion JPEG (Joint Photographic Experts Group).

The moving object/stationary object detection section 126 is adapted to carry a processing on the image data at the first resolution output from the camera section 111-1 to detect from the image based on the image data a moving object area (motion area) and a stationary object area (object appearance area, object disappearance area). The metadata generation section 127 is adapted to generate metadata MD1 including detection information on a moving object or a stationary object output from the moving object/stationary object detection section 126 and detection information from the external sensor 113-1. Herein, the external sensor 113-1 is configured to detect some events, for example, at a particular position on the divided image dealt with by the camera section 111-1, and is composed of an infrared sensor, a temperature sensor, a sound sensor, or the like.

Although a detail description is omitted, the camera sections 111-2 to 111-n are configured similarly to the above-mentioned camera section 111-1. The camera sections 111-2 to 111-n are each adapted to pick up a divided image dealt with by itself to generate and output image data corresponding to this divided image at the first resolution (for example, UXGA). Also, although a detail description is omitted, the image data processing sections 112-2 to 112-n are configured similarly to the above-mentioned image data processing section 112-1. The image data processing sections 112-2 to 112-n are each adapted to carry out a processing on the image data from the camera sections 111-2 to 111-n to generate and output first compressed image data V2H to VnH, second compressed image data V2L to VnL, and metadata MD2 to MDn including detection information such as a moving object and a stationary object.

The data transfer section 114 is adapted to transmit the first compressed image data V2H to VnH, the second compressed image data V2L to VnL, and the metadata MD2 to MDn generated in the respective image data processing sections 112-1 to 112-n via the network 150 to the image display apparatus 130. In this sense, the data transfer section 114 constitutes a data transmission section. It should be noted that the data transfer section 114 is also provided, as will be described later, with a function of receiving attention area information transmitted from the image display apparatus 130. Also, the data transfer section 114 further transmits the above-mentioned image transforming information such as the lens information, the information on camera inclination, or the blending information with adjacent cameras via the network 150 to the image display apparatus 130.

An operation of the image transmission apparatus 110 illustrated in FIG. 4 will be described. From the image pickup section 121 of the camera section 111-1, among the panorama images functioning as subjects, an image pickup signal (analog signal) corresponding to the divided image dealt with by the camera section 111-1 is obtained. This image pickup signal is supplied to the image pickup signal processing section 122. The image pickup signal processing section 122 carries out an analog signal processing such as sample and hold and gain control conversion, conversion from the analog signal to a digital signal, and also a digital signal processing such as white balance adjustment and gamma correction on the image pickup signal to generate image data at the first resolution (for example, UXGA).

The image data generated in the camera section 111-1 is supplied to the high resolution encoder 123, the size change section 124, and the moving object/stationary object detection section 126 in the image data processing section 112-1. In the high resolution encoder 123, for example, the compression encoding processing based on Motion JPEG is carried out on the image data supplied from the camera section 111-1 to generate the first compressed image data V1H.

Then, in the size change section 124, a processing such as thinning or interpolation is carried out on the image data supplied from the camera section 111-1 to generate image data at a second resolution (for example, QVGA) that is lower than the first resolution. The image data at the second resolution is supplied to the low resolution encoder 125. In the low resolution encoder 125, for example, the compression encoding processing based on Motion JPEG is carried out on the image data supplied from the size change section 124 to generate the second compressed image data V1L.

Moreover, in the moving object/stationary object detection section 126, based on the image data supplied from the camera section 111-1, a detection processing regarding a moving object and a stationary object is carried out. Detection information regarding the moving object and the stationary object detected in the moving object/stationary object detection section 126 is supplied to the metadata generation section 127. Also, the metadata generation section 127 is supplied with the detection information from the external sensor 113-1 for detecting some events at a particular position on the divided image dealt with by the camera section 111-1. The metadata generation section 127 generates the metadata MD1 including the detection information regarding the moving object and the stationary object output from the moving object/stationary object detection section 126 and the detection information of the external sensor 113-1.

In the camera sections 111-2 to 111-n, similarly to the above-mentioned camera section 111-1, the image data at the first resolution (for example, UXGA) corresponding to the divided image dealt with by itself is generated. In this manner, the image data at the first resolution generated in the respective camera sections 111-2 to 111-n is supplied to the corresponding image data processing sections 112-2 to 112-n. In the image data processing sections 112-2 to 112-n, similarly to the above-mentioned image data processing section 112-1, a processing is carried out on the image data from the camera sections 111-2 to 111-n and the like to generate, for example, the first compressed image data V2H to VnH, the second compressed image data V2L to VnL, the metadata MD2 to MDn including the detection information regarding the moving object, the stationary object and the like.

The first compressed image data V2H to VnH, the second compressed image data V2L to VnL, and the metadata MD2 to MDn including the detection information such as the moving object and the stationary object generated in the respective image data processing sections 112-1 to 112-n are supplied to the data transfer section 114. In the data transfer section 114, the first compressed image data V1H to VnH, the second compressed image data V1L to VnL, and the metadata MD1 to MDn are converted into files and transmitted via the network 150 to the image display apparatus 130. Also, from the data transfer section 114, the image transforming information such as the lens information related to the camera sections 111-2 to 111-n, the information on camera inclination, or the blending information with adjacent cameras is transmitted via the network 150 to the image display apparatus 130.

Figure 5:
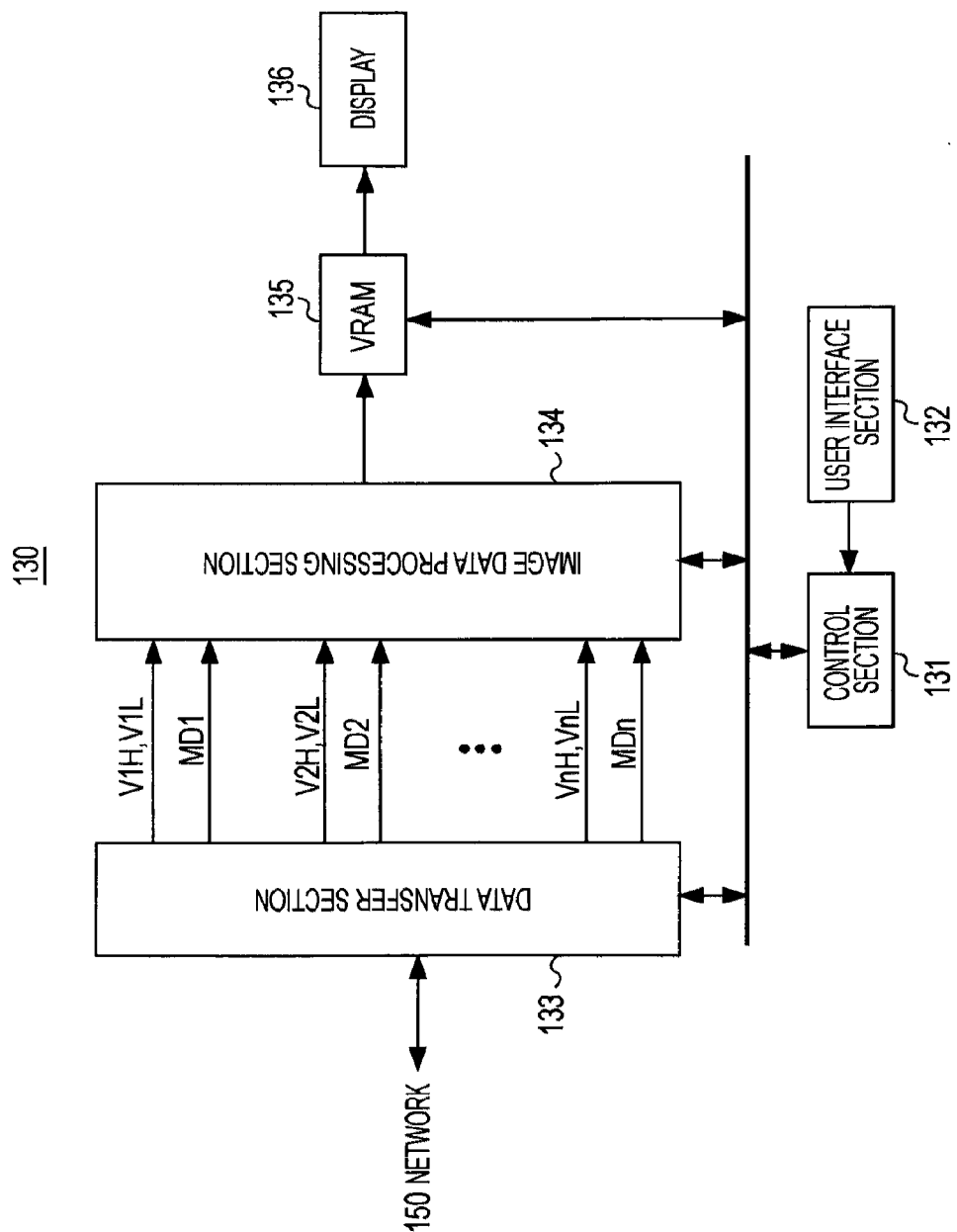
FIG. 5 is a block diagram of a specific example of an image display apparatus.

FIG. 5 illustrates a specific configuration example of the image display apparatus 130. The image display apparatus 130 has a control section 131, a user interface section 132, a data transfer section 133, an image data processing section 134, a VRAM (Video Random Access Memory) 135, and the display 136.

The control section 131 is adapted to control the respective sections in the image display apparatus 130. The control section 131 is composed of a CPU and control program. The control section deals with start and end of execution of image display apparatus, and accepts some interruption by user interface section, then executes a certain function in respective sections. The user interface section 132 is composed of an operation key, a remote control signal reception device, or the like. The user interface section 132 is connected to the control section 131. The user interface section 132 is adapted to generate an operation signal in accordance with a user operation and supply the operation signal to the control section 131.

The data transfer section 133 is adapted to receive the first compressed image data V1H to VnH, the second compressed image data V1L to VnL, and the metadata MD1 to MDn transmitted from the image transmission apparatus 110 via the network 150. In this sense, the data transfer section 133 constitutes a data reception section. Also, the data transfer section 133 receives the image transforming information related to the above-mentioned camera sections 111-2 to 111-n such as the lens information, the information on camera inclination, or the blending information with adjacent cameras transmitted from the image transmission apparatus 110.

The image data processing section 134 is adapted to decode the second compressed image data V1L to VnL received in the data reception section 133, use the respective pieces of decoded data, and generate panorama image data for displaying the panorama image based on the above-mentioned image transforming information. In this sense, the image data processing section 134 constitutes a first image data generation section.

In addition, the image data processing section 134 decodes the first compressed image data corresponding to the high resolution view angle on the panorama image among the first compressed image data V1H to VnH received in the data reception section 133 and uses the decoded data to generate high resolution image data for displaying a high resolution image. In this sense, the image data processing section constitutes a second image data generation section. The high resolution view angle on the panorama image is determined in the control section 131 based on a user operation. In this sense, the control section 131 constitutes a view angle determination section. A detail of the determination processing for the high resolution view angle in the control section 131 will be described later.

Figure 6:
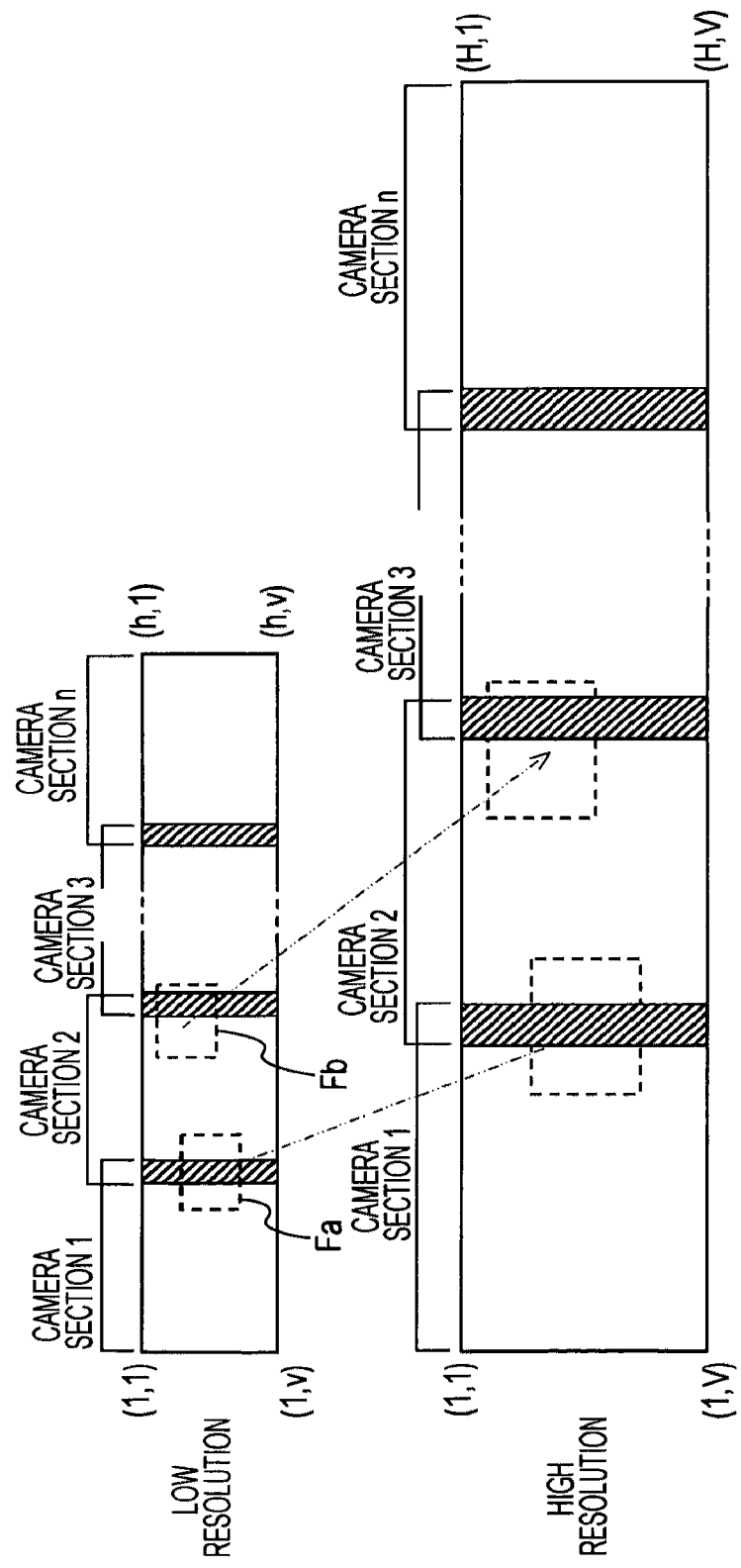
FIG. 6 illustrates configurations of image data at a high resolution (first resolution) and image data at a low resolution (second resolution) corresponding to the respective camera sections of the image transmission apparatus.

FIG. 6 illustrates configurations of image data at the high resolution (first resolution) and image data at the low resolution (second resolution) corresponding to the camera sections 111-1 to 111-n of the above-mentioned image transmission apparatus 110. Camera sections 1 to n illustrated in FIG. 6 respectively represent the camera sections 111-1 to 111-n.

In the image data processing section 134, pieces of low resolution image data of the camera sections 1 to n are synthesized to generate panorama image data having h pixels in the horizontal direction and v pixels in the vertical direction. In this case, the low resolution image data of the respective camera sections has an overlapping area (hatched area) with low resolution image data of an adjacent camera section. In the image data processing section 134, the image data synthesis processing is performed so that the areas are overlapped one another.

Also, pieces of high resolution image data of the camera sections 1 to n respectively correspond to the low resolution image data of the camera sections 1 to n. Herein, the pieces of high resolution image data of the camera sections 1 to n constitutes panorama image data having H pixels in the horizontal direction and V pixels in the vertical direction. Herein, h/H and v/V represent compression ratios in the size change section 124 of the respective image data processing sections 112-1 to 112-n in the image transmission apparatus 110.

The low resolution image data of the respective camera sections constituting the panorama image data corresponds to the high resolution image data of the respective camera sections. For that reason, the image data processing section 134 can easily generate the high resolution image data corresponding to the high resolution image position determined on the panorama image by using the above-mentioned relationship.

For example, as illustrated in FIG. 6, in a case where a high resolution display area denoted by a broken line Fa on the panorama image at the low resolution is determined, the high resolution data of the camera section 1 and the camera section 2 are used to generate the high resolution image data. Also, for example, as illustrated in FIG. 6, in a case where a high resolution display area denoted by a broken line Fb on the panorama image at the low resolution is determined, the high resolution data of the camera section 2 and the camera section 3 are used to generate the high resolution image data.

It should be noted that FIG. 6 illustrates an example in which the respective camera sections are arranged in the horizontal direction, but it is also conceivable to adopt an example in which the respective camera sections are arranged in the vertical direction or an example in which the respective camera sections are arranged in a matrix.

Also, the image data processing section 134 uses, among the second compressed image data V1L to VnL received in the data reception section 133, decoded data of the second compressed image data of the division information corresponding to the detection position indicated by the detection information included in the metadata MD1 to MDn received in the data reception section 133 to generate detection position image data for displaying the detection position image. In this sense, the image data processing section 134 constitutes a third image data generation section. It should be noted that as described above, as all pieces of the second compressed image data V1L to VnL are decoded to generate the panorama image data, it is not necessary to newly carry out a decoding processing when the detection position image data is generated.

In addition, the image data processing section 134 uses, among the second compressed image data V1L to VnL received in the data reception section 133, decoded data of the second compressed image data of the division information corresponding to the attention area set on the panorama image to generate attention area image data for displaying the attention area image. In this sense, the image data processing section 134 constitutes a fourth image data generation section. It should be noted that as described above, as all pieces of the second compressed image data V1L to VnL are decoded to generate the panorama image data, it is not necessary to newly carry out a decoding processing when the attention area image data is generated. The setting of the attention area on the panorama image is performed in the control section 131 based on a user setting operation. In this sense, the control section 131 constitutes an attention area setting section.

The VRAM 135 holds data at the respective pixels constituting the panorama image data, the high resolution image data, the detection position image data, and the attention area image data generated in the image data processing section 134 at addresses corresponding to the view angles and also sequentially outputs the data at the respective pixels to the display 136 in order of scanning lines. The display 136 is composed, for example, of a LCD (Liquid Crystal Display), a plasma display, or the like.

Figure 7:
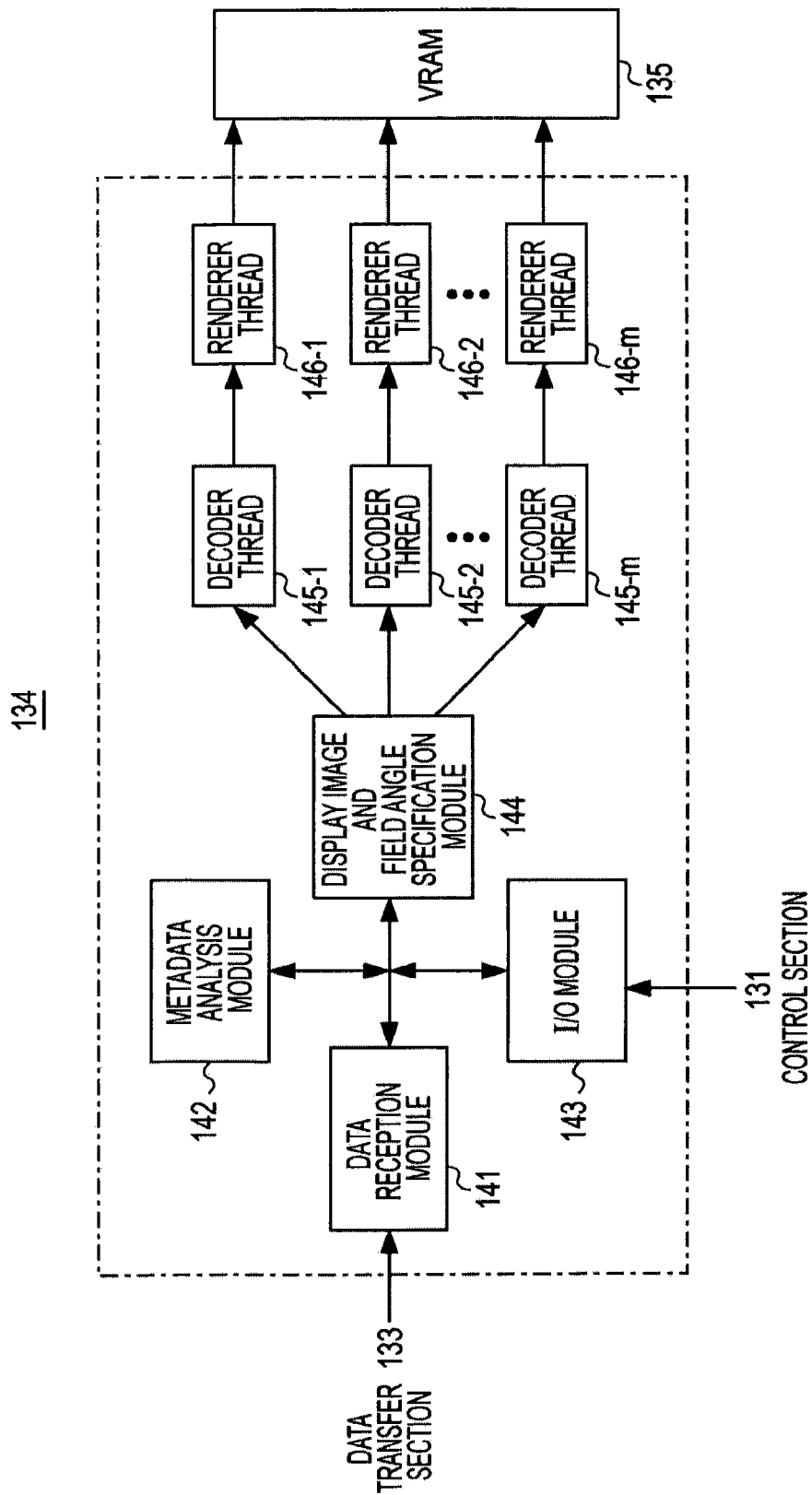
FIG. 7 illustrates a function block of an image data processing section in the image display apparatus.

The image data processing section 134 described above is composed, for example, of software. FIG. 7 illustrates a function block of the image data processing section 134. The image data processing section 134 is provided with a data reception module 141, a metadata analysis module 142, an I/O module 143, a display image and field angle specification module 144, decoder threads 145-1 to 145-m, and renderer threads 146-1 to 146-m.

The data reception module 141 is adapted to receive the first compressed image data V1H to VnH, the second compressed image data V1L to VnL, and the metadata MD1 to MDn from the data transfer section 133. The metadata analysis module 142 is adapted to analyze the metadata MD1 to MDn received in the data reception module 141 to obtain information such as the detection position or the detection type. the I/O module 143 is adapted to receive control information such as the set high resolution display area or the set attention area from the control section 131.

The display image and field angle specification module 144 is adapted to transmit the necessary compressed image data to the decoder threads 145-1 to 145-m based on the information obtained in the metadata analysis module 142 such as the detection position or the detection type and the control information received in the I/O module 143 among the first compressed image data V1H to VnH and the second compressed image data V1L to VnL received in the data reception module 141.

For example, in order to generate the panorama image data for displaying the panorama image, decoding of the second compressed image data V1L to VnL is performed. Also, among the first compressed image data V1H to VnH, decoding corresponding to the high resolution display area is performed. For example, in a case where the high resolution display area extends across the first and second divided images, decoding of the first compressed image data V1H and V2H is performed.

The renderer threads 146-1 to 146-m are adapted to select, from the decoded data obtained in the decoder threads 145-1 to 145-m, pixel data of the panorama image, the high resolution image, the detection position image, and the attention area image, to arrange the pixel data at addresses corresponding to the view angles of the panorama image, the high resolution image, the detection position image, and the attention area image of the VRAM 135.

The operation in the image display apparatus 130 illustrated in FIG. 5 will be described. The data transfer section 133 receives the first compressed image data V1H to VnH, the second compressed image data V1L to VnL, and the metadata MD1 to MDn transmitted from the image transmission apparatus 110 via the network 150 as well as the image transforming information such as the lens information, the information on camera inclination, or the blending information with adjacent cameras. The first compressed image data V1H to VnH, the second compressed image data V1L to VnL, the metadata MD1 to MDn, and the information conversion information are supplied to the image data processing section 134.

In the image data processing section 134, decoding is performed on the second compressed image data V1L to VnL, and by using the respective pieces of decoded data, based on the information conversion information, the panorama image data for displaying the panorama image is generated. Then, in the VRAM 135, the data at the respective pixels constituting the panorama image are arranged and held at the addresses corresponding to the view angles of the panorama image. As a result, the panorama image is displayed in the panorama image display section on a screen of the display 136. In this case, a processing for collecting plural pieces of image data is not performed, but the display is performed by arranging and holding the respective pieces of image data at the corresponding addresses of the VRAM 135. Thus, in order to cope with the increase in the number of pixels and the higher frame rate, the countermeasure becomes facilitated when the panorama image is displayed.

Also, in the image data processing section 134, among the first compressed image data V1H to VnH, the first compressed image data related to the divided image corresponding to the high resolution view angle on the panorama image is decoded, and the decoded data is used to generate the high resolution image data for displaying a high resolution image. Then, in the VRAM 135, the data at the respective pixels constituting the high resolution image are arranged and held at the addresses corresponding to the view angle of the high resolution image. As a result, the high resolution image is displayed in the high resolution image display section on the screen of the display 136.

In addition, in the image data processing section 134, among the second compressed image data V1L to VnL, by using decoded data of the second compressed image data related to the division information corresponding to the detection position indicated by the detection information included in the metadata MD1 to MDn, the detection position image data for displaying the detection position image is generated. Then, in the VRAM 135, the data at the respective pieces of image data constituting the detection position image are held at the addresses corresponding to the view angle of the detection position image. As a result, the detection position images such as the moving object, the stationary object, and the like are displayed in a detection position image display section 203 on the screen of the display 136.

It should be noted that although not described in the above, a frame or the like indicating the detection position is displayed on the panorama image while corresponding to the detection position indicated by the detection information included in the metadata MD1 to MDn. Also, color differentiation may be effected in this frame or the like depending on types of detection, for example, the moving object detection, the stationary object detection, or the detection of the external sensor, so that the user can easily distinguish the type of the detection.

Furthermore, in the image data processing section 134, among the second compressed image data V1L to VnL, decoded data of the second compressed image data related to the division information corresponding to the attention area set on the panorama image is used to generate the attention area image data for displaying the attention area image. Then, in the VRAM 135, the data at the respective pixels constituting the attention area image are held at the addresses corresponding to the view angle of the attention area image. As a result, the attention area image is displayed in the attention area image display section on the screen of the display 136.

It should be noted that although not described in the above, a frame or the like indicating the attention area is displayed on the panorama image. Herein, the attention area is set based on a user setting operation for the attention area in the control section 131. The attention area can be set at an arbitrary field angle. As will be described later, in a case where the high resolution display area is determined based on the user setting operation for the attention area image, the high resolution image corresponding to the selected attention area image is displayed in the high resolution image display section on the screen of the display 136. In this case, as the attention area can be set at an arbitrary field angle, the number of pixels in the high resolution image data may be larger than that in the high resolution image display section in some cases. In such a case, for example, adjustment on the number of pixels is performed on the high resolution image data through reduction or trimming so as to be fitted into the high resolution image display section.

Figure 8:
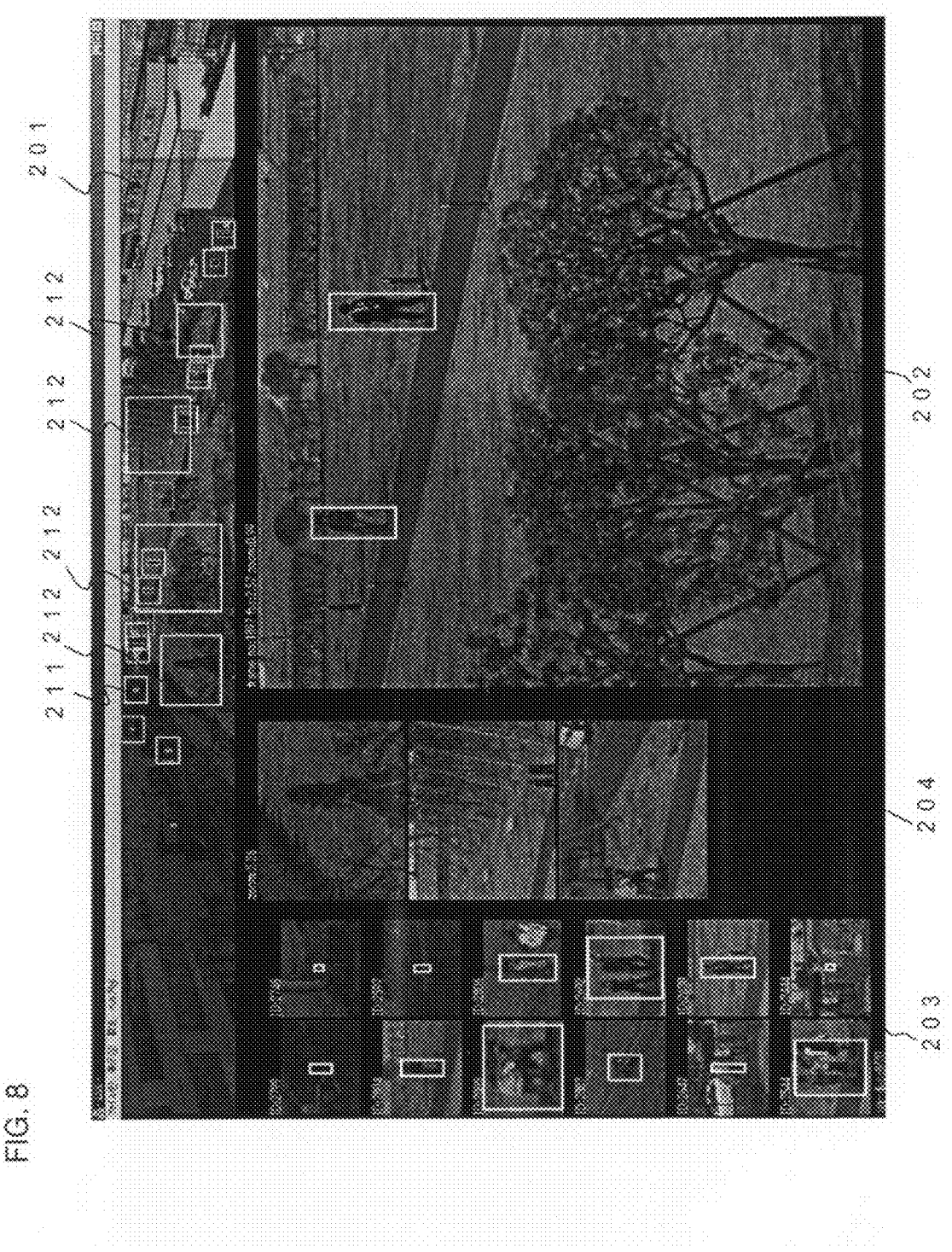
FIG. 8 illustrates a screen display example of a display.

FIG. 8 illustrates a screen display example of the display 136. A panorama image display section 201 is provided on an upper side of the screen. The panorama image at the low resolution based on the panorama image data generated in the image data processing section 134 is displayed in the panorama image display section 201. Also, a frame 211 corresponding to the detection position images such as the moving object, the stationary object, and the like and a frame 212 corresponding to the attention area set by the user operation are displayed on the panorama image.

In addition, the detection position image display section 203 and an attention area image display section 204 are provided on a left side of the screen. The detection position image at the low resolution such as the moving object or the stationary object (image surrounded by the frame 211 on the panorama image) is displayed in the detection position image display section 203. It should be noted that a frame surrounding the detection target object such as the moving object or the stationary object is displayed on the respective detection position images. The low resolution image in the attention area (image surrounded by the frame 212 on the panorama image) is displayed in the attention area image display section 204.

Furthermore, a high resolution image display section 202 is provided at a position from the center to the right side of the screen. As the high resolution image displayed in the high resolution image display section 202, the high resolution image in the high resolution display area determined in the control section 131 based on the user operation is displayed.

Now, a detail of the determination processing for the high resolution display area in the control section 131 is described. As described above, when a position selection operation is performed by the user on the panorama image displayed on the panorama image display section 201, the control section 131 determines the high resolution display area based on the position selection operation. In this case, the user uses the user interface section 132, for example, to move a cursor on the panorama image to a desired position and performs a click operation, whereby the high resolution display area can be selected. Then, in this case, the high resolution image in a predetermined area including the position selected based on the user operation is displayed in the high resolution display section 202.

Also, as described above, when a selection operation is performed by the user for the detection position image from the detection position image displayed in the detection position image display section 203, the control section 131 determines the high resolution display area based on the selection operation. In other words, the control section 131 determines the position corresponding to the detection position image selected based on the user operation (area surrounded by the frame 211) as the high resolution display area. In this case, the user uses the user interface section 132, for example, to move the cursor to the desired detection position image and performs the click operation, whereby the desired detection position image can be selected. Then, in this case, the selected detection position image (high resolution image) is displayed in the high resolution image display section 202.

In addition, as described above, when a selection operation is performed by the user for the desired attention area image from the attention area image displayed in the attention area image display section 204, the control section 131 determines the high resolution display area based on the selection operation. In other words, the control section 131 determines the area corresponding to the attention area image selected based on the user operation (area surrounded by the frame 212) as the high resolution display area. In this case, the user uses the user interface section 132, for example, to move the cursor to the desired attention area image and performs the click operation, whereby the desired attention area image can be selected. Then, in this case, the selected attention area image (high resolution image) is displayed in the high resolution image display section 202.

As described above, in the image display system 100 illustrated in FIG. 1, based on the image data output from the respective camera sections 111-1 to 111-n of the image transmission apparatus 110, the respective image data processing sections 112-1 to 112-n perform compression encoding on the image data at the first resolution (high resolution) to generate the first compressed image data V1H to VnH and also perform compression encoding on the image data at the second resolution (low resolution) which is lower than the first resolution to generate the second compressed image data V1L to VnL, and the first compressed image data V1H to VnH and the second compressed image data V1L to VnL are transmitted from the data transfer section 114 via the network 150 to the image display apparatus 130. Therefore, in the image display system 100, unlike the case where the image data output from the respective camera sections 111-1 to 111-n is used to generate the image data for the panorama image, the processing data amount on the side of the image transmission apparatus 110 is reduced and the processing load can be alleviated.

Also, in the image display system 100 illustrated in FIG. 1, the respective image data processing sections 112-1 to 112-n of the image transmission apparatus 110 generate the metadata MD1 to MDn including the detection information on the moving object or the stationary object detected by processing the image data output from the camera section 111-1 to 111-n or the detection information from the external sensors 113-1 to 113-n, and the metadata MD1 to MDn are also transmitted from the data transfer section 114 via the network 150 to the image display apparatus 130. Therefore, in the image display system 100, on the side of the image display apparatus 130, the display of the detection position on the panorama image, or further, the display of the high resolution image corresponding to the detection position and the like can be easily performed.

In addition, in the image display system 100 illustrated in FIG. 1, the image data processing section 134 decodes the second compressed image data V1L to VnL at the second resolution (low resolution) received in the data transfer section 133 to generate the panorama image data, and the panorama image at the low resolution is displayed on the display 136. Therefore, in the image display system 100, the processing data amount on the side of the image display apparatus 130 is reduced, and the processing load can be alleviated.

Furthermore, in the image display system 100 illustrated in FIG. 1, the image data processing section 134 uses, among the first compressed image data V1H to VnH at the first resolution (high resolution) received in the data transfer section 133, decoded data of the first compressed image data related to the divided image corresponding to the high resolution display area determined based on the user operation to generate the high resolution image data, and the high resolution image is displayed on the display 136. Therefore, in the image display system 100, the image data processing section 134 of the image display apparatus 130 only decodes and uses the necessary first compressed image data among the first compressed image data V1H to VnH, and the processing data amount on the side of the image display apparatus 130 is reduced, and the processing load can be alleviated.

Also, in the image display system 100 illustrated in FIG. 1, the image data processing section 134 of the image display apparatus 130 generates the detection position image data based on the detection information such as the moving object or the stationary object received in the data transfer section 133 from the decoded data of the second compressed image data V1L to VnL, and the detection position image at the low resolution is displayed on the display 136. Therefore, in the image display system 100, the detection position images corresponding to the respective detection positions can be displayed on the display 136 in the index style. It should be noted that in this case, as the decoded data of the second compressed image data which has been already obtained for displaying the panorama image is used, it is unlikely that the processing load is significantly increased.

In addition, in the image display system 100 illustrated in FIG. 1, on the image display apparatus 130 side, the user can set the attention area at an arbitrary field angle on the panorama image displayed on the display 136 in the user interface section 132. Then, in the image display system 100 illustrated in FIG. 1, the image data processing section 134 of the image display apparatus 130 generates the attention area image data based on the set attention area from the decoded data of the second compressed image data V1L to VnL, and the attention area image at the low resolution is displayed on the display 136. Therefore, in the image display system 100, the attention area images corresponding to the respective attention areas can be displayed on the display 136 in the index style. It should be noted that in this case, as the decoded data of the second compressed image data which has been already obtained for displaying the panorama image is used, it is unlikely that the processing load is significantly increased.

Moreover, in the image display system 100 illustrated in FIG. 1, the high resolution display area is determined based on the position selection operation performed by the user for the panorama image displayed on the display 136, the selection operation performed by the user for the detection position image displayed on the display 136, or the selection operation performed by the user for the attention area image displayed on the display 136. Therefore, in the image display system 100, on the image display apparatus 130 side, the user can display and observe the panorama image at the arbitrary position, the arbitrary detection position image, or the arbitrary attention area image on the display 136 at the high resolution image.

It should be noted that according to the above-mentioned embodiment, the respective image data processing sections 112-1 to 112-n in the image transmission apparatus 110 generate, as illustrated in FIG. 9A, the first compressed image data V1H to VnH related to the high resolution (first resolution) and the second compressed image data V1L to VnL at the low resolution (second resolution) in each frame, and the data transfer section 114 transmits the data to the image display apparatus 130.

However, as illustrated in FIG. 9B, the pieces of second compressed image data V1L to VnL at the low resolution (second resolution) are generated in each frame but it is considerable that the pieces of first compressed image data V1H to VnH related to the high resolution (first resolution) may be generated in intermittent frames. In an example of FIG. 9B, the pieces of first compressed image data V1H to VnH are generated in every other frame, the data is generated in a frame indicated by a solid line.

In this manner, as the pieces of first compressed image data V1H to VnH are intermittently generated, the processing loads in the respective image data processing sections 112-1 to 112-n can be alleviated. Also, the transmission data amount from the data transfer section 114 to the image display apparatus 130 can be reduced, and the transfer load can be alleviated. It should be noted that in FIGS. 9A and 9B, numeric values denote frame numbers.

Figures 10A, 10B:
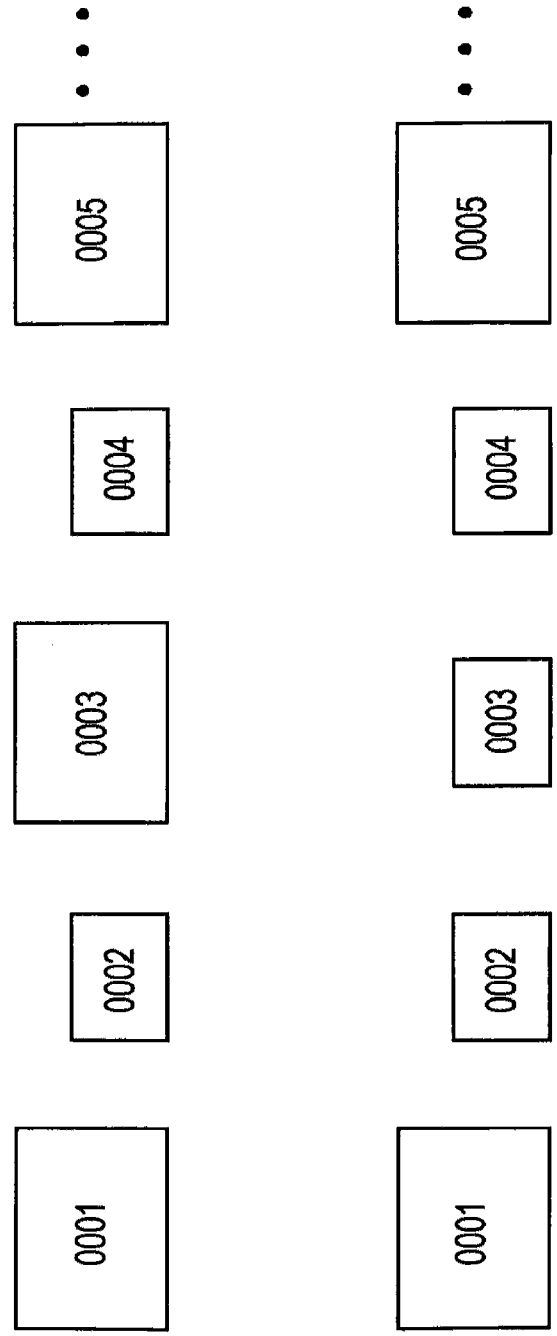
FIGS. 10A and 10B illustrate an example of the combination ratio of the first compressed image data and the second compressed image data in each frame used when a high resolution image data is displayed.

In addition, according to the above-mentioned embodiment, the image data processing section 134 of the image display apparatus 130 uses the first compressed image data V1H to VnH in each frame to display the high resolution image, but it is also considerable that the first compressed image data V1H to VnH and the second compressed image data V1L to VnL are used at a predetermined combination ratio. FIG. 10A illustrates an example in which the first compressed image data V1H to VnH and the second compressed image data V1L to VnL are used at a combination ratio of 1:1, and FIG. 10B illustrates an example in which the first compressed image data V1H to VnH and the second compressed image data V1L to VnL are used at a combination ratio of 1:3. It should be noted that in FIGS. 10A and 10B, numeric values denote frame numbers.

In this case, in a frame using the second compressed image data V1L to VnL, the number of pixels is increased through interpolation or the like. As the ratio of the second compressed image data V1L to VnL is increased, the image quality is decreased. In this manner, when the high resolution image is displayed, by using the second compressed image data V1L to VnL at an appropriate ratio, the processing load in the image data processing section 134 can be alleviated.

It should be noted that according to the above-mentioned embodiment, the image data processing sections 112-1 to 112-n of the image transmission apparatus 110 perform compression encoding on the image data at the first resolution (for example, UXGA) output from the camera section 111-1 to 111-n as it is in the high resolution encoder 123 to generate the first compressed image data V1H to VnH. However, for example, when the number of pixels of the camera section 111-1 to 111-n in the horizontal or vertical direction is further larger, in the image data processing sections 112-1 to 112-n, it is also considerable that a predetermined image area is cut out from the image data output from the camera section to obtain the image data at the first resolution (for example, UXGA) and the image data at the first resolution is compress-encoded to generate the first compressed image data.

Figure 11:
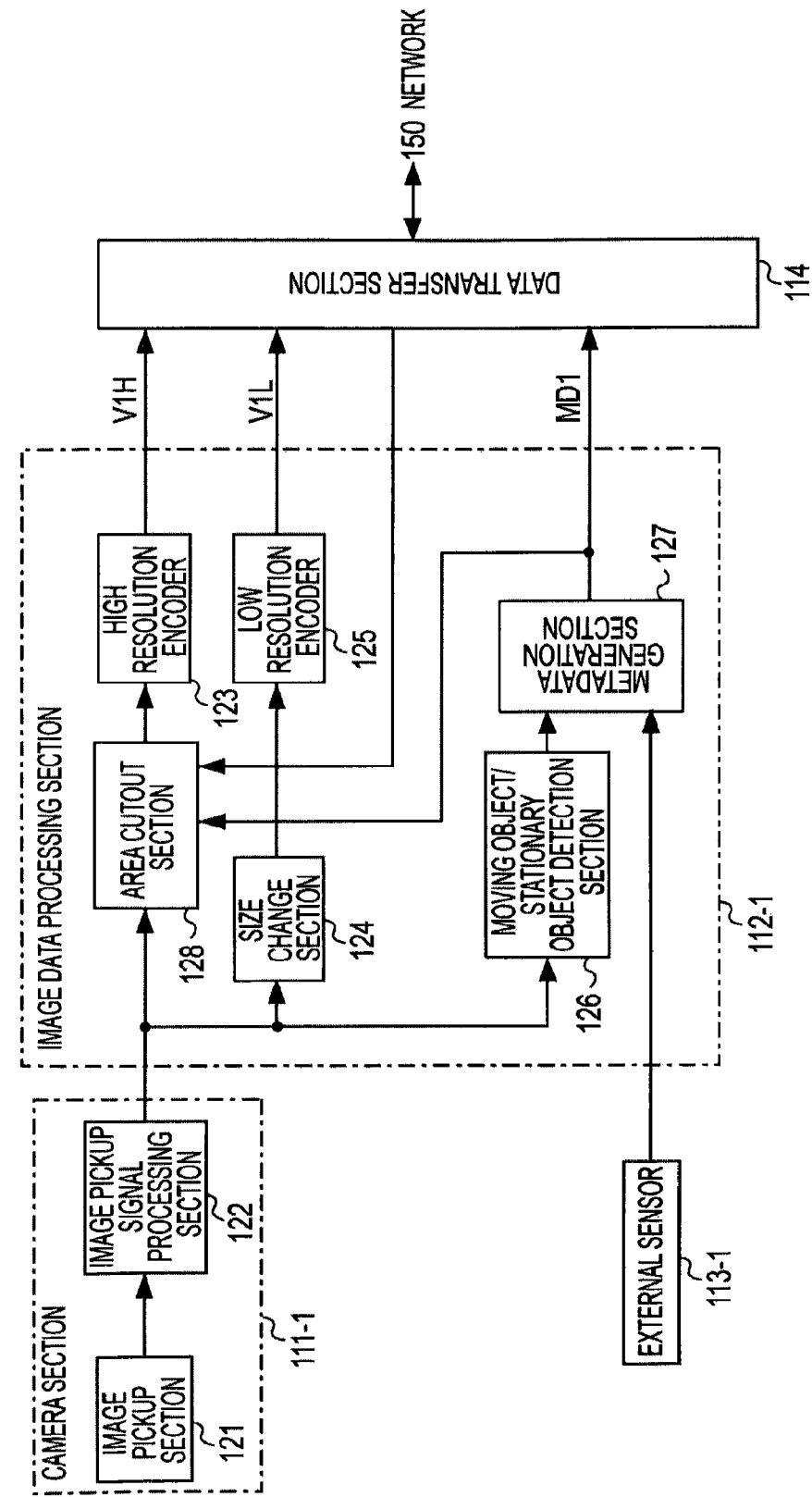
FIG. 11 is a block diagram of another configuration example of the image transmission apparatus.

FIG. 11 illustrates another configuration example of the image transmission apparatus 110 in the above-mentioned case. In FIG. 11, parts corresponding to the camera sections 111-2 to 111-n and the image data processing sections 112-2 to 112-n are excluded. In FIG. 11, parts corresponding to those in FIG. 4 are allocated with the same reference numerals, and a detail description thereof is omitted.

The image data processing section 112-1 has an area cutout section 128 in addition to the high resolution encoder 123, the size change section 124, the low resolution encoder 125, the moving object/stationary object detection section 126, and the metadata generation section 127.

The area cutout section 128 is adapted to cut out image data in a predetermined image area from the image data output from the camera section 111-1 to obtain image data at the first resolution (for example, UXGA). The area cutout section 128 is supplied with the metadata MD1 generated in the metadata generation section 127. Also, the area cutout section 128 is supplied with the attention area information received in the data transfer section 114 from the image display apparatus 130 side. In this sense, the data transfer section 114 constitutes an information reception section.

In the area cutout section 128, for example, based on the detection information such as the moving object or the stationary object included in the metadata MD1, the image area corresponding to the detection position for the moving object, the stationary object, or the like is set as the predetermined image area that should be cut out. Also, in the area cutout section 128, for example, based on the attention area information, the attention area set on the image display apparatus 130 side is set as the predetermined image area that should be cut out. It should be noted that the number of image areas cut out in the area cutout section 128 varies depending on the number of detections such as the moving object or the stationary object and the number of attention areas set on the image display apparatus 130 side.

The high resolution encoder 123 is adapted to perform compression encoding on the image data in the respective image areas cut out in the area cutout section 128 to generate the first compressed image data V1H. In this case, as described above, in a case where the number of image areas cut out in the area cutout section 128 is two or larger, plural pieces of the first compressed image data V1H are obtained from the high resolution encoder 123.

Other configuration and operation of the image data processing section 112-1 are similar to those illustrated in FIG. 4. Also, configurations and operations of the image data processing sections 112-2 to 112-n which are omitted from the drawing are similar to those of the image data processing section 112-1.

As the image transmission apparatus 110 is configured as illustrated in FIG. 11, in the image data processing sections 112-1 to 112-n, the image data of the predetermined image area (for example, the detection position area such as the moving object or the stationary object or the attention area set on the image display apparatus 130 side) is cut out from the image data output from the camera section, whereby it is possible to generate the first compressed image data at the first resolution.

Therefore, even when the number of pixels of the camera section 111-1 to 111-n in the horizontal or vertical direction is large, as compression encoding is selectively performed only on the necessary image area to generate the first compressed image data, the processing loads in the image data processing sections 112-1 to 112-n can be alleviated. It should be noted that in this case, in the image display apparatus 130, the display of the high resolution image in the detection position for the moving object, the stationary object, or the like and at the set attention area can be performed, but it may be impossible to perform the display of the high resolution image in an arbitrary position on the panorama image.

Also, according to the above-mentioned embodiment, such an example has been described that only one type of the second compressed image data at the second resolution is generated on the image transmission apparatus 110 side and transmitted to the image display apparatus 130. However, it is also considerable that on the image transmission apparatus 110 side, as the second compressed image data at the second resolution, plural types of data varying in resolution stepwise may be generated and transmitted to the image display apparatus 130. In this case, on the image display apparatus 130, plural types of the second resolution can be selectively used, and change in image size or the like can be easily performed.

In the above-mentioned embodiments, the image to be captured is not limited to the motion picture image, and may be a still image. However, the motion picture image has a larger data capacity than the still image, and therefore the effects of the above-mentioned embodiments are also more significant.

In addition, the apparatus in which the plural cameras are used to pick up the images has been described as an example but is not limited to the above. The apparatus may adopt such a configuration that while a rotation control is performed on one camera and one panorama image may be obtained by performing image pickup by plural times.

Moreover, among the image display apparatuses 130, the above-mentioned embodiments may of course be applied to an image processing apparatus without the display 136.

It should be understood by those skilled in the art that various modifications, combinations, sub-combinations and alterations may occur depending on design requirements and other factors insofar as they are within the scope of the appended claims or the equivalents thereof.

What is claimed is:

1. An image display system comprising:
   an image transmission apparatus; and
   an image display apparatus,
   the image transmission apparatus being connected to the image display apparatus via a network,
   the image transmission apparatus including
   a plurality of camera sections adapted to output image data corresponding to respective n divided images obtained by dividing a panorama image into n pieces,
   a plurality of image data processing sections adapted to carry out a processing on the image data output from the respective camera sections to generate m pieces of first compressed image data corresponding, respectively, to m of the n divided images by compression-encoding image data at a first resolution and generate l pieces of second compressed image data corresponding, respectively, to l of the n divided images by compression-encoding image data at a second resolution which is lower than the first resolution, wherein the sum of l and m is equal to at least n, and wherein among the m pieces of the first compressed image data and the l pieces of the second compressed image data is included at least one piece of compressed image data corresponding to each of the n divided images, and a data transmission section adapted to transmit the m pieces of the first compressed image data and the l pieces of the second compressed image data generated in the respective image data processing sections to the image display apparatus, the image display apparatus including a data reception section adapted to receive the m pieces of the first compressed image data and the l pieces of the second compressed image data transmitted from the image transmission apparatus, a first image data generation section adapted to generate panorama image data for displaying the panorama image by using decoded data of plural pieces of the l pieces of the second compressed image data received in the data reception section, a view angle determination section adapted to determine a high resolution view angle on the panorama image, a second image data generation section adapted to generate high resolution image data for displaying a high resolution image by using, among the m pieces of the first compressed image data received in the data reception section, decoded data of the piece of the first compressed image data of the divided images corresponding to the high resolution view angle determined in the view angle determination section, and a display section adapted to display the panorama image based on the panorama image data generated in the first image data generation section and the high resolution image based on the high resolution image data generated in the second image data generation section on a display.

2. An image transmission apparatus comprising:

a plurality of camera sections adapted to output image data corresponding to respective n divided images obtained by dividing a panorama image into n plural pieces;

a plurality of image data processing sections adapted to carry out a processing on the image data output from the respective camera sections to generate m pieces of first compressed image data corresponding, respectively, to m of the n divided images by compression-encoding image data at a first resolution and generate l pieces of second compressed image data corresponding, respectively, to l of the n divided images by compression-encoding image data at a second resolution which is lower than the first resolution, wherein the sum of l and m is equal to at least n, and wherein among the m pieces of the first compressed image data and the l pieces of the second compressed image data is included at least one piece of compressed image data corresponding to each of the n divided images; and a data transmission section adapted to transmit the m pieces of the first compressed image data and the l pieces of the second compressed image data generated in the respective image data processing sections.

3. The image transmission apparatus according to claim 2, wherein:

the respective image data processing sections further generate pieces of metadata including one of detection information on a moving object or a stationary object detected by processing the image data output from the camera sections and detection information from an external sensor; and the data transmission section transmits the pieces of metadata generated in the respective image data processing sections in addition to the l pieces of the first compressed image data and the m pieces of the second compressed image data generated in the respective image data processing sections.

4. The image transmission apparatus according to claim 2, wherein the respective image data processing sections generate the pieces of the first compressed image data by using a smaller number of frames than that for generating the pieces of the second compressed image data.

5. The image transmission apparatus according to claim 2, wherein the respective image data processing sections cut out image data at a predetermined image area from the image data output from the camera sections and carry out the compression encoding on the cutout image data to generate the pieces of the first compressed image data.

6. The image transmission apparatus according to claim 5, wherein the respective image data processing sections determine the predetermined image area based on one of the detection information on the moving object or the stationary object detected by processing the image data output from the camera sections and the detection information from an external sensor.

7. The image transmission apparatus according to claim 5, wherein:

the respective image data processing sections further include an information reception section adapted to receive information on an attention area set on the panorama image; and the respective image data processing sections determine the predetermined image area based on the attention area information received in the information reception section.

8. The image transmission apparatus according to claim 3, wherein the panorama image is a motion picture image.

9. The image transmission apparatus according to claim 4, wherein the panorama image is a motion picture image.

10. The image transmission apparatus according to claim 5, wherein the panorama image is a motion picture image.

11. An image transmission method of transmitting image data corresponding to a panorama image, the method comprising the steps of:

capturing images by using a plurality of cameras corresponding to respective n divided images obtained by dividing the panorama image into n pieces;

generating m pieces of first compressed image data corresponding, respectively, to m of the n divided images obtained by compression-encoding image data at a first resolution through carrying out a processing on the image data output from the respective cameras in capturing;

generating l pieces of second compressed image data corresponding, respectively, to l of the n divided images obtained by compression-encoding image data at a second resolution which is lower than the first resolution through carrying out a processing on the image data output from the respective cameras in capturing, wherein the sum of l and m is equal to at least n, and wherein among the m pieces of the first compressed image data and the l pieces of the second compressed image data is included at least one piece of compressed image data corresponding to each of the n divided images; and transmitting the m pieces of the first compressed image data and the l pieces of the second compressed image data.

12. An image processing apparatus adapted to generate an image displayed on a display, the image processing apparatus comprising:

a data reception section adapted to receive m pieces of first compressed image data corresponding, respectively, to m of n divided images obtained by compression-encoding image data at a first resolution generated through carrying out a processing on m respective pieces of image data corresponding, respectively, to m of the n divided images obtained by dividing a panorama image into n pieces and l pieces of second compressed image data corresponding, respectively, to l of the n divided images obtained by compression-encoding image data at a second resolution which is lower than the first resolution, wherein the sum of l and m is equal to at least n, and wherein among the m pieces of the first compressed image data and the l pieces of the second compressed image data is included at least one piece of compressed image data corresponding to each of the n divided images;

a first image data generation section adapted to generate panorama image data for displaying the panorama image by using decoded data of plural pieces of the l pieces of the second compressed image data received in the data reception section;

a view angle determination section adapted to determine a high resolution view angle on the panorama image;

a second image data generation section adapted to generate high resolution image data for displaying a high resolution image by using, among the m pieces of the first compressed image data received in the data reception section, decoded data of the piece of the first compressed image data of the divided images corresponding to the high resolution view angle determined in the view angle determination section; and an output section adapted to output the panorama image data generated in the first image data generation section and the high resolution image data generated in the second image data generation section on the display.

13. The image processing apparatus according to claim 12, wherein the view angle determination section determines the high resolution view angle based on a selection operation executed by a user for a position on the panorama image displayed on the display.

14. The image processing apparatus according to claim 12, wherein:

the data reception section further receives metadata including one of detection information on a moving object or a stationary object detected by processing the respective image data and detection information from external sensors provided corresponding to the respective camera sections;

the image processing apparatus further comprises a third image data generation section adapted to generate detection position image data for displaying a detection position image by using, among the l pieces of second compressed image data received in the data reception section, decoded data of the piece of the second compressed image data of the divided images corresponding to the detection position indicated by the detection information included in plural pieces of the metadata received in the data reception section; and the output section outputs, in addition to the panorama image data generated in the first image data generation section and the high resolution image data in the second image data generation section, the detection position image data generated in the third image data generation section to the display.

15. The image processing apparatus according to claim 14, wherein the view angle determination section determines the high resolution view angle based on a selection operation executed by the user for the detection position image displayed on the display.

16. The image processing apparatus according to claim 12, further comprising:

an attention area setting section adapted to set an attention area on the panorama image displayed on the display; and a third image data generation section adapted to generate attention area image data for displaying an attention area image by using decoded data of the piece of the second compressed image data of the divided images corresponding to the attention area set in the attention area setting section, wherein the output section outputs, in addition to the panorama image data generated in the first image data generation section and the high resolution image data in the second image data generation section, the attention area image data generated in the third image data generation section to the display.

17. The image processing apparatus according to claim 16, wherein the view angle determination section determines the high resolution view angle based on a selection operation executed by the user for the attention area image displayed on the display.

18. The image processing apparatus according to claim 12, wherein the second image data generation section generates the high resolution image data for displaying the high resolution image by using the piece of the first compressed image data and the piece of the second compressed image data of the divided images corresponding to the high resolution view angle determined in the view angle determination section at a predetermined ratio.

19. The image processing apparatus according to claim 12, wherein:

the respective pieces of the image data are obtained by image pickup in camera sections corresponding to the respective n divided images obtained by dividing the panorama image into n pieces; and the panorama image is a motion picture image.

20. The image processing apparatus according to claim 14, wherein:

the respective pieces of the image data are obtained by image pickup in camera sections corresponding to the respective n divided images obtained by dividing the panorama image into n pieces; and the panorama image is a motion picture image.

21. The image processing apparatus according to claim 16, wherein:

the respective pieces of the image data are obtained by image pickup in camera sections corresponding to the respective n divided images obtained by dividing the panorama image into n pieces; and the panorama image is a motion picture image.

22. The image processing apparatus according to claim 19, wherein the panorama image and the high resolution image are displayed on a same screen.

23. The image processing apparatus according to claim 20, wherein the panorama image, the high resolution image, and the detection position image are displayed on a same screen.

24. The image processing apparatus according to claim 21, wherein the panorama image, the high resolution image, and the attention area image are displayed on a same screen.

25. An image display method comprising the steps of:

receiving m pieces of first compressed image data corresponding, respectively, to m of n divided images obtained by compression-encoding image data at a first resolution generated through carrying out a processing on respective m of n pieces of image data obtained while corresponding camera sections pick up the n divided images obtained by dividing a panorama image into n pieces and l pieces of second compressed image data corresponding, respectively, to l of the n divided images obtained by compression-encoding image data at a second resolution which is lower than the first resolution, wherein the sum of l and m is equal to at least n, and wherein among the m pieces of the first compressed image data and the l pieces of the second compressed image data is included at least one piece of compressed image data corresponding to each of the n divided images;

generating panorama image data for displaying the panorama image by using decoded data of plural pieces of l pieces of the second compressed image data received in the receiving;

determining a high resolution view angle on the panorama image;

displaying high resolution image data for displaying a high resolution image by using, among the m pieces of the first compressed image data received in the receiving, decoded data of the piece of the first compressed image data of the divided images corresponding to the high resolution view angle determined in the determining; and outputting the panorama image based on the generated panorama image data and the high resolution image based on the generated resolution image data on a display.

26. A non-transitory computer readable medium on which is stored a program for instructing a computer to function as:

data reception means adapted to receive m pieces of first compressed image data corresponding, respectively, to m of n divided images obtained by compression-encoding image data at a first resolution generated through carrying out a processing on respective m of n pieces of image data obtained while corresponding camera sections pick up the n divided images obtained by dividing a panorama image into n pieces and l pieces of second compressed image data corresponding, respectively, to l of the n divided images obtained by compression-encoding image data at a second resolution which is lower than the first resolution, wherein the sum of l and m is equal to at least n, and wherein among the m pieces of the first compressed image data and the l pieces of the second compressed image data is included at least one piece of compressed image data corresponding to each of the n divided images;

first image data generation means adapted to generate panorama image data for displaying the panorama image by using decoded data of plural pieces of the l pieces of the second compressed image data received by the data reception means;

view angle determination means adapted to determine a high resolution view angle on the panorama image;

second image data generation means adapted to generate high resolution image data for displaying a high resolution image by using, among the m pieces of the first compressed image data received by the data reception means, decoded data of the piece of the first compressed image data of the divided images corresponding to the high resolution view angle determined by the view angle determination means; and display means adapted to display the panorama image based on the panorama image data generated by the first image data generation means and the high resolution image based on the resolution image data generated by the second image data generation means on a display.

* * * * *